3,660,484
ARYL UREAS, A PROCESS FOR THEIR PREPARATION AND AGENTS CONTAINING THEM

Henry Martin and Dieter Duerr, Basel, and Rudolf Hitz, Muttenz, Switzerland, assignors to Ciba Limited, Basel, Switzerland
No Drawing. Continuation of application Ser. No. 513,551, Dec. 13, 1965. This application Oct. 2, 1969, Ser. No. 863,769
Claims priority, application Switzerland, Dec. 17, 1964, 16,314/64
Int. Cl. C07c *157/00*
U.S. Cl. 260—552 R     3 Claims

ABSTRACT OF THE DISCLOSURE

Ureas of the formula

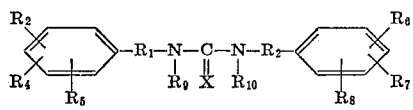

wherein $R_1$ and $R_2$ each represents a linear or branched alkylene radical which may be hydroxylated and which contains 1 to 4 carbon atoms, and either $R_1$ or $R_2$ may be a direct N—phenyl bond; $R_3$ to $R_8$ are identical or different and represent hydrogen or halogen atoms, or alkyl, alkoxy or alkylthio groups, or the groups —$CF_3$, —CN, $NO_2$, SCN,

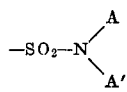

or

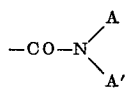

(where A and A' represent hydrogen atoms or lower alkyl groups) with the proviso that at least one of the substituents $R_3$ to $R_8$ is a trifluoromethyl group, and wherein $R_9$ and $R_{10}$ represent hydrogen atoms or lower alkyl groups and X stands for an oxygen atom or a sulphur atom. These ureas are capable of killing off a variety of harmful organisms; for example, they have an insecticidal, acaricidal, bactericidal, fungicidal, molluscicidal and herbicidal effect.

---

This application is a continuation of application Ser. No. 513,551 filed Dec. 13, 1965, and now abandoned.

The present invention provides new ureas of the general formula

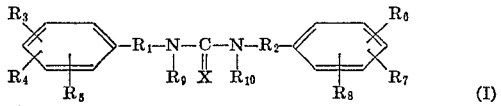

wherein $R_1$ and $R_2$ each represents a linear or branched alkylene radical which may be hydroxylated and which contains 1 to 4 carbon atoms, and either $R_1$ or $R_2$ may be a direct N—phenyl bond; $R_3$ to $R_8$ are identical or different and represent hydrogen or halogen atoms, or alkyl, alkoxy or alkylthio groups, or the groups

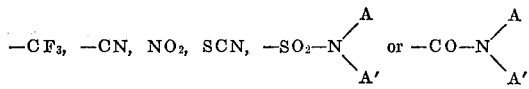

(where A and A' represent hydrogen atoms or lower alkyl groups) with the proviso that at least one of the substituents $R_3$ to $R_8$ is a trifluoromethyl group, and wherein $R_9$ and $R_{10}$ represent hydrogen atoms or lower alkyl groups and X stands for an oxygen atom or a sulphur atom.

In the above definition, "lower" alkyl groups, alkoxy and alkylthio groups are those which contain at most 4 carbon atoms in each case.

The ureas defined by the above Formula I are capable of killing off a variety of harmful organisms; for example, they have an insecticidal, acaricidal, bactericidal, fungicidal, molluscicidal and herbicidal effect.

Ureas of the Formula I may be used, for example, for protecting keratinic material from being eaten by insects.

In an aqueous dispersion, they possess affinity for the keratine fibre and protect the material treated with them from being eaten by the larvae of moths and certain species of beetles, for example fur and carpet eating beetles. The ureas of the invention of the Formula I are also suitable for the disinfection and disinfecting cleaning of objects, for example, cellulosic materials. Such ureas may be incorporated with textile detergents and toilet soaps.

Furthermore, the ureas of the Formula I display an excellent effect against harmful fungi, acarides and insects.

Especially potent ureas are those of the Formula I in which either $R_1$ or $R_2$ represents an alkylene radical containing 1 to 3 carbon atoms, preferably 1 or 2 carbon atoms, and either of these symbols stands for a direct N—phenyl bond or has the same meaning as the other; $R_3$ to $R_8$ each stands for hydrogen, an alkyl group, a halogen atom and/or a trifluoromethyl group, and at least one of them must represent a trifluoromethyl group, and $R_9$ and $R_{10}$ each is a hydrogen atom and X stands for an oxygen or sulphur atom.

The new ureas of the Formula I can be prepared by any of the methods usually used for making ureas. They are obtained, for example, when a compound of the formula

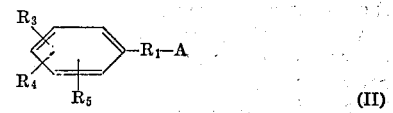

is reacted with a compound of the formula

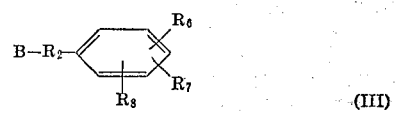

In both these formulae, A and B represent residues capable of forming the urea or thiourea bridge by condensation or an additive combination.

Quite generally speaking, the procedure may consist in reacting an amine of the formula

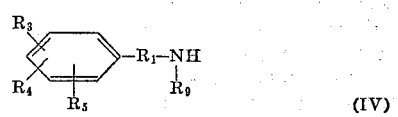

and an amine of the formula

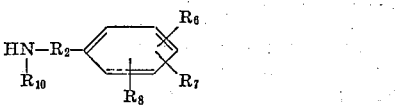

in either order of succession with a functional derivative of carbonic acid or of thiocarbonic acid respectively. For example: An amine IV or an amine V may be reacted with phosgene or thiophosgene and the resulting carbamic acid halide or isocyanate—especially when $R_9$ or $R_{10}$ represents hydrogen—may be reacted with the other amine V or IV respectively. Instead of phosgene there may be used, for example, a halogen-carbonic acid ester, for example, an alkyl or aryl ester for the reaction with an amine IV or V, and the resulting carbamate is then further reacted with the amine V or IV respectively.

Furthermore, for example, an amine IV or V may be reacted with an alkali metal isocyanate in an acid solution to form the corresponding N′,N′-unsubstituted urea, which is then transamidated with the amine V or IV to yield the desired urea of the Formula I.

The transamidation referred to may be carried out in the presence or absence of a solvent. A suitable solvent is, for example, ortho-dichlorobenzene, anisole or phenol.

The thioureas may be prepared principally in the same manner as the ureas. Thus, for example, the reaction of phenyl-isothiocyanates with benzylethylamines, phenylethylamines or the like leads to the desired ureas.

As examples of suitable anilines there may be mentioned: para-chloraniline, 3,4-dichloraniline, 3,5-dichloraniline, 3,4,5 - trichloraniline, 2,4,5 - trichloraniline, 3-chloro-4-methoxyaniline, 3 - chloro - 4 - methylaniline, 4-chloro-3-trifluoromethylaniline, bis-3,5 - trifluoromethylaniline, 4-amino-benzenesulphonamide, 4-aminobenzoic acid amide, metanilamide and 4-thiocyananiline. Suitable phenylalkylamines are, for example, meta-trifluoromethylbenzylamine, benzylamine, 4-chloro-benzylamine, 4-bromobenzylamine, 4-nitrobenzylamine, 3,4-dichlorobenzylamine, 3,4-dibromobenzylamine, 2,4-dichlorobenzylamine and 2,4,6-trichlorobenzylamine.

Instead of the benzylamines, there may be used corresponding α-phenylethylamines, β-phenylethylamines, β-phenylpropylamines or γ-phenylpropylamines.

As mentioned above, the new compounds of this invention display a distinct action against harfmul organisms of the vegetable and animal kingdoms. They are especially effective against bacteria, fungi, fungus spores, worms, insects, snails and the like. Thus, the compounds of this invention have a broad pesticidal spectrum.

In this connection, it is especially advantageous that the new compounds produce no toxic side effects against culture plants and warm-blooded animals when used in the concentrations required for their antiparasitic application; this enables the new compounds to be widely used in combating harmful organisms, for example in plant protection, timber protection, for preserving a wide variety of technical products, for protecting fibrous materials from harmful microorganisms, for preserving agricultural produce, as disinfectants in veterinary medicine, in general hygiene and in cosmetics.

In this connection, it is especially important that the compounds of the present invention do not lose their bactericidal and fungicidal activity even in the presence of proteinic substances and soaps. The new compounds have no objectionable odour of their own and are well tolerated at least by healthy skin.

As examples of the use of the new compounds in plant protection there may be mentioned the treatment of plant seeds and of wholly or only partially developed plants as well as of the soil in which the plants grow, to protect them against harmful organisms, especially harmful fungi, fungus spores, bacteria, nematodes and insects. In this connection, too, as long as they are used in the requisite useful concentrations, the new protective products do not produce any phytotoxic side effects.

As examples of technical products that can be preserved or disinfected with the new ureas there may be mentioned: Textile auxiliaries and improving agents, glues, bonding agents, paints, thickeners, colour and printing pastes and similar preparations based on organic or inorganic dyestuffs or pigments, including those which incorporate casein or other organic substances. Furthermore, wall and ceiling paints, for example, those containing a proteinic pigment bonding agent, are protected from attacks by pests when they contain the new ureas.

Furthermore, the new ureas may also be used for protecting fibres and textile materials. In this case, they deposit on natural and synthetic fibres alike and give them a durable action against harmful organisms, for example, fungi, bacteria and insects. This may be achieved by adding the ureas before, during or after a treatment of these textile materials with other products, for example colour or printing pastes or dressing agents. The ureas of the invention are particularly efficient at protecting wool fibres against moths and other textile-eating pests. For example, when applied to the fibre in an acetonic solution or after having deposited on the fibre from an aqueous liquor in the presence of an emulsifier, they act most efficiently against moth larvae.

The new ureas may also be used as preservatives in the cellulose and paper industries, inter alia to prevent the known slime formation in paper-making machines, caused by micro-organisms.

The present invention further provides preparations for combating pests, for example, harmful fungi, fungus spores, bacteria, worms, acarides, molluscus and insects, which contain a urea of the general Formula I and, if desired, one or more of the following additives: a solvent, a solid, liquid or gaseous diluent, an adhesive, an emulsifier, a dispersant, a cleaning agent, a wetting agent, a further pesticide such as a fungicide, bactericide, herbicide, acaricide, insecticide and fertilizer.

By varying the additives with which the new active substances are combined in the preparations of this invention, there are obtained preparations particularly suitable for cleaning, disinfection or cosmetics.

Thus, for example, when the ureas of this invention are combined with detergents or surface-active substances they furnish detergents and cleansers having an outstanding antibacterial and/or antimycotic activity.

The compounds of the general Formula I may be incorporated, for example, in soaps or combined with soap-free detergents or surface-active substances or with mixtures of soaps and soap-free detergents.

As examples of soap-free detergents that can be used in admixture with the new products there may be mentioned, for example, alkylaryl sulphonates, tetrapropylbenzenesulphonates, fatty alcohol sulphonates, condensation products from fatty acids and methyltaurine, condensation products from fatty acids with hydroxyethanesulphonates, fatty acid and protein condensates, primary alkylsulphonates, nonionic products, for example, condensation products from alkylphenols and ethylene oxides as well as cationic compounds. The new carbanilides may also be used in industrial detergents, for example together with a condensed phosphate, for example 20 to 50% alkali metal tripolyphosphate, or in the presence of an organic lyophilic polymer capable of enhancing the dirt-carrying capacity of the wash liquor, for example an alkali metal salt of carboxymethyl cellulose (cellulose glycollic acid).

By the addition of cleansing agents, for example anionic, cationic or nonionic products, to the new ureas, the antibacterial and/or antimycotic activity of the latter is not only adversely affected but in many cases such a combination even produces an unexpected synergism of the effect.

The cleansing agents having a disinfectant action obtained in this manner can be used, for example, in laundering. When being used for this purpose it is especially advantageous that the new active substances, used in a suitable concentration, deposit from the wash liquor on to the fibrous material and render the latter durably antibacterial and antimycotic. Textile materials treated in this manner are also proteced from the occurrence of body odour caused by microorganisms.

The cleansing preparations of this invention containing ureas of the general Formula I can be used not only in laundering but, for example, also as industrial cleansers or as domestic cleansers, and also in the food industry, for example in dairies, breweries, abattoirs, in agriculture and in veterinary hygiene.

The new ureas may also be used as ingredients of preparations used for cleaning and disinfection in hospitals and surgeries, for example, for cleaning articles worn by patients, bedlinen, wards and apparatus. If necessary, the new ureas may be combined for this purpose with other disinfectants and products having an antiseptic effect so that any demand on cleanliness and sterility can be satisfied with their aid. In this connection, the fact that the new compounds do not lose their efficacy against microorganisms even in the presence of blood or serum is of special significance.

The new ureas may also be used in preparations used for cleaning the skin, for example the hands, and having an antibacterial and/or antimycotic effect; the new ureas may also be used in the surgery, if necessary in conjunction or combination with other bactericidal and/or fungicidal substances, skin protectives and the like. Furthermore, they effectively prevent the occurrence of body odour caused by microorganisms, and in this connection it is also an advantage that the new ureas do not irritate the skin, at least healthy skin, and have no objectionable odour of their own, as is the case, for example, with chlorinated phenols.

As additives having a biocidal effect, which may be present in the preparations of this invention apart from the ureas of the general Formula I, there may be mentioned, for example: 3,4-dichlorobenzyl alcohol, ammonium compounds for example, diisobutyl-phenoxyethoxyethyl dimethyl benzyl ammonium chloride, cetyl pyridinium chloride, cetyl trimethyl ammonium bromide, halogenated dihydroxydiphenylmethanes, tetramethylthiuram disulphide, 2,2-thio-bis-(4,6-dichlorophenol), also organic compounds containing thiotrichloromethyl groups, also 2-nitro-2-furfuryl iodide, salicylanilides, dichloro salicylanilides, dibromosalicylanilides, tribromosalicylanilide, dichlorocyanuric acid, tetrachlorosalicylanilides, aliphatic thiuram sulphides and hexachlorophene (2,2'-dihydroxy-3,5,6,3',5',6'-hexachlorodiphenylmethane).

The preparations of the invention having a disinfectant activity may contain as further additives antioxidants, light filters, optical brighteners, softeners, aromas and the like.

When the new compounds are incorporated with the products conventionally used in cosmetics, there are obtained products that are particularly suitable for cosmetic uses.

In view of their great versatility, the preparations of this invention that contain ureas of the general Formula I may be used in a wide variety of forms, for example as soaps in tablet form, semisolid or liquid soaps, pastes, powders, emulsions, suspensions, solutions in organic solvents, as sprays, powders, granulates, tablets, pencils, in capsules made from gelatin or other materials, as ointments, skin and shaving creams, mouth-washes, liquid, semisolid or solid toothpastes and other dental preparations, in hair shampoos and other products for treating hair.

The activity of the ureas containing $CF_3$ groups that can be manufactured by the present process in combating harmful organisms of the animal and vegetable kingdoms can also be embodied in plastic mouldings. When a plasticizer is used, it is advantageous to add the biocidal substance to the plastic materials in the form of a solution or dispersion in the plasticizer, for example dimethyl phthalate, dibutyl phthalate, dicyclohexyl phthalate, trihexyl phthalate, dibutyl adipate, benzylbutyl adipate, aliphatic sulphonic acid esters or triglycol acetate. It is advantageous to ensure that the biocidal substance is as evenly as possible dispersed in the plastic material. Plastic materials having sterilizing properties may be used for utilitarian objects of all kinds which are desired to develop a prophylactic action against pathogens of all types, for example putrefactive organisms or cutaneous fungi, for example in doormats, handles, door fitments, seats, treads in swimming pools, wall coverings, especially in hospitals. When the biocidal compound is incorporated in a suitable floor wax or floor polish, there are obtained products for the care of floors and furniture having a disinfectant and insecticidal activity.

The following examples illustrate the invention.

EXAMPLE 1

N-4-chlorobenzyl-N'-4-chloro-3-trifluoromethylphenyl urea

A solution of 32.2 g. of 4-chloro-3-trifluoromethylphenyl isocyanate in 50 ml. of dioxan is stirred dropwise into a solution of 21.3 g. of 4-chlorobenzylamine in 100 ml. of dioxan. 30 minutes later, ½ litre of water is added and the resulting precipitate is recrystallized from alcohol; it melts at 159 to 160.5° C., when the melting point test is carried out rapidly. Yield: 43 g.

In a manner identical with that described above, the following ureas and thioureas can be manufactured:

| No. | Ureas, X=oxygen | M.P., °C. |
|---|---|---|
| 2 | N-3,4-dichlorobenzyl-N'-3,5-ditrifluoromethyl-phenyl urea. | 203–205 |
| 3 | N-3,4-dichlorobenzyl-N'-4-chloro-3-trifluoromethylphenyl. | 165–167 |
| 4 | N-3,4-dichlorobenzyl-N'-3-trifluoromethylphenyl. | 163–164 |
| 5 | N-4-chlorobenzyl-N'-3-trifluoromethylphenyl. | 141–143 |
| 6 | N-4-chlorobenzyl-N'-3,5-ditrifluoromethylphenyl. | 230–232 |
| Thioureas, X=sulphur | | |
| 7 | N-3,4-dichlorobenzyl-N'-trifluoromethylphenyl. | 143–145 |
| 8 | N-3,4-dichlorobenzyl-N'-3,5-ditrifluoromethyl-phenyl. | 168–169 |
| 9 | N-4-chlorobenzyl-N'-3,5-ditrifluoromethylphenyl. | 172–173 |
| 10 | N-4-chlorobenzyl-N'-3-trifluoromethylphenyl. | 159–160 |
| As further examples there may be mentioned— | | |
| 11 | N-β(4-chlorophenyl)-ethyl-N'-4-chloro-3-trifluoromethyl-phenyl urea. | 168–169 |
| 12 | N-β(4-chlorophenyl)-ethyl-N'-3,5-ditrifluoromethylphenylurea. | 140–141 |
| 13 | N-α-phenylethyl-N'-3,5-ditrifluoromethylphenylurea. | 160 |
| 14 | N-β-phenylethyl-N'-3,5-ditrifluoromethylphenylurea. | 156 |
| 15 | N-α-phenylethyl-N'-4-chloro-3-trifluoromethylphenylurea. | 161–162 |
| 16 | N-2-chlorobenzyl-N'-3,5-ditrifluoromethylphenylurea. | 203 |
| 17 | N-methyl-N-3,4-dichlorobenzyl-N'-3,5-ditrifluoromethyl-phenylurea. | 147 |
| 18 | N-methyl-N-4-chlorobenzyl-N'-3-trifluoromethyl-phenylurea. | 151 |
| 19 | N-β-(4-chlorophenyl)-ethyl-N'-3-trifluoromethyl-phenylurea. | 146–147 |
| 20 | N-benzyl-N'-3,5-ditrifluoromethyl-phenylurea. | 187 |
| 21 | N-benzyl-N'-4-chloro-3-trifluoromethyl-phenyl-urea. | 149 |
| 22 | N-benzyl-N'-3,5-ditrifluoromethyl-phenylthiourea. | 151–153 |
| 23 | N-3,4-dichlorobenzyl-N'-4-chloro-3-trifluoromethyl-phenyl thiourea. | 153.5–155.5 |
| 24 | N-4-chlorobenzyl-N'-4-chloro-3-trifluoromethyl-phenylthiourea. | 185–186 |
| 25 | N-benzyl-N'-4-chloro-3-trifluoromethylphenyl-thiourea. | 153–154 |
| 26 | N-β-(4-chlorophenyl)-ethyl-N'-3,5-ditrifluoromethyl-phenylurea. | 98–99 |
| 27 | N-4-methoxybenzyl-N'-3,5-ditrifluoromethyl-phenyl-thiourea. | 162–163.5 |
| 28 | N-3,4-dimethylbenzyl-N'-3,5-ditrifluoromethyl-phenyl-thiourea. | 153–154 |
| 29 | N-methyl-N-(α-methyl-β-hydroxy-β-phenyl)-ethyl-N'-3,5-ditrifluoromethyl-phenylthiourea. | 145–146 |
| 30 | N-methyl-N-3,4-dichlorobenzyl-N'-3-trifluoromethyl-phenylthiourea. | 186–188 |
| 31 | N-β-(4-chlorophenyl)-ethyl-N'-3-trifluoromethyl-phenylthiourea. | 108.5–109 |
| 32 | N-benzyl-N'-3-trifluoromethyl-phenylthiourea. | 120–121 |
| 33 | N-β-phenyl-ethyl-N'-3,5-ditrifluoromethyl-phenyl-phenylthiourea. | 115–116 |
| 34 | N-α-phenyl-ethyl-N'-3,5-ditrifluoromethylphenyl-thiourea. | 158 |
| 35 | N-β-(4-chlorophenyl)-ethyl-N'-4-chloro-3-trifluoromethyl-phenylthiourea. | 115–116 |
| 36 | N-α-phenyl-ethyl-N'-4-chloro-3-trifluoromethyl-phenylthiourea. | 128–130 |

EXAMPLE 2

The new ureas and thioureas of the Formula I develop a very strong activity against Gram-positive bacteria, above all against Staphylococci and Streptococci. They also act against pathogenic fungi, for example *Trichophyton interdigitale*.

The antibacterial activity in the dilution test was measured as follows:

Bacteriostatic and bactericidal properties 20 mg. of active substance were dissolved in 10 ml. of propyleneglycol, then 0.25 ml. of this solution was added to 4.75 ml. of sterile glucose broth and the whole was further diluted 1:10 in the tubes.

These solutions were then inoculated with *Staphylococcus aureus* and incubated for 48 hours at 37° C. (bacteriostatic test). After a test period of 24 hours, the amount of these cultures held by a loop of wire was smeared over glucose agar-agar plates and incubated for 24 hours at 37° C. (test for bactericidal effect). After the afore-mentioned test periods, the following limit concentrations in parts per million were found in the bacteriostatic and bactericidal tests:

Limit concentrations in parts per million (test strain used: *Staphylococcus aureus* Z 2070).

| Compound No. | Bacteriostatic effect | Bactericidal effect |
|---|---|---|
| 5 | 100 | 100 |
| 8 | ~0.9 | 1 |
| 9 | 0.1 | 0.1 |
| 10 | 0.1 (0.01) | 0.1 (0.1) |
| 6 | (¹) | ~10 |
| 4 | 0.1 | 0.1 |
| 3 | 0.1 | 0.1 |
| 2 | 0.1 | 0.1 |
| 11 | 0.1 | 0.3 |
| 12 | 0.3 | 1 |
| 13 | 1 | 1 |
| 14 | 1 | 1 |
| 28 | 0.03 | 0.3 |
| 37 | 0.1 | 0.3 |
| 36 | 0.3 | 0.3 |
| 23 | 0.1 | 0.1 |
| 24 | 0.1 | 0.3 |
| 35 | 0.3 | 1 |
| 34 | 0.1 | 0.3 |
| 33 | 0.3 | 1 |
| 31 | 1 | 3 |
| 25 | 1 | 3 |

¹ No reading possible because of turbidity.

NOTE.—Values in parentheses=effect in the presence of soap (1:50).

EXAMPLE 3

Compounds Nos. 26, 31 and 35 have the following effective fungistatic limit concentrations in parts per million against *Aspergillus niger* and *Rhizopus nigricans*:

| Compound No. | Aspergillus niger | Rhizopus nigricans |
|---|---|---|
| 26 | 100 | 3 |
| 31 | 100 | 10 |
| 35 | 100 | 10 |

EXAMPLE 4

Compounds Nos. 25, 13, 33, 34, 35, 21 and 36 proved to be effective stomach poisons when tested against destructive moths.

EXAMPLE 5

(a) A mixture was prepared from the following ingredients:

| | Percent |
|---|---|
| Bolus alba | 25 |
| Silica ("Hisil," reg. trademark) | 20 |
| Compound No. 22 | 50 |
| Emulsifier (Invadin JFC, reg. trademark) | 3.5 |
| Wetting agent (Ultravon C, reg. trademark) | 1.5 | and finely ground in a hammer-type ball mill. The resulting powder is very easy to disperse in water.

(b) 8 snails (*Australorbis glabratus*) having a shell diameter of 1 to 1.5 cm. were kept for 24 hours in 450 cc. of an aqueous dispersion containing 0.4 part per million of active substance, obtained as described under (a) above. After this treatment the snails were transferred to fresh water, left there for 24 hours and then inspected. In all cases it was observed that the snails had been completely killed off.

We claim:
1. The urea of the formula

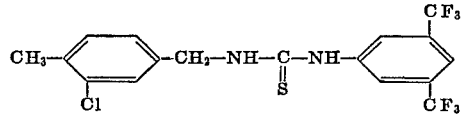

2. The urea of the formula

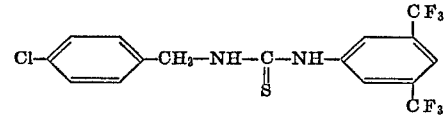

3. The urea of the formula

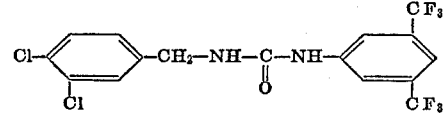

References Cited

UNITED STATES PATENTS 3,151,023  9/1964  Martin _____ 260—553
3,230,141  1/1966  Frick et al. _____ 260—553

OTHER REFERENCES

Beaver et al., J. Am. Chem. Soc., vol. 79, pp. 1236–1245 (1957).

Yale, J. Med. and Pharm. Chem., vol. 1, No. 2, pp. 121–133 (1959).

Kharida, J. Indian Chem. Soc., vol. 37, No. 11, pp. 705–709 (1960).

LEON ZITVER, Primary Examiner

M. W. GLYNN, Assistant Examiner

U.S. Cl. X.R.

260—553; 424—322; 252—106, 107, 357; 106—15 R